May 20, 1958     G. LANGE     2,835,168
INTERCHANGEABLE LENS SYSTEM FOR PHOTOGRAPHIC PURPOSES
Filed Aug. 9, 1955
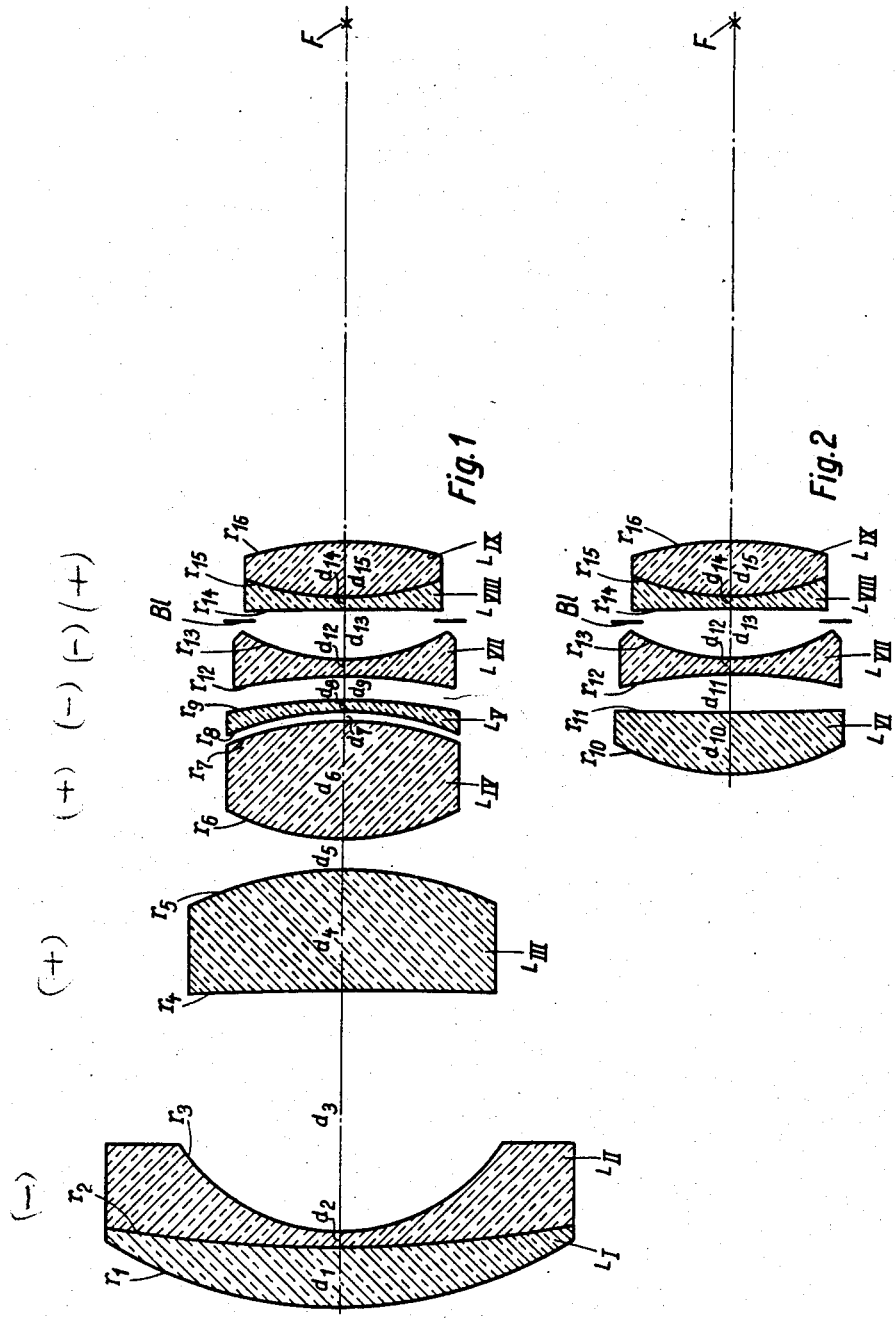

2,835,168
INTERCHANGEABLE LENS SYSTEM FOR PHOTOGRAPHIC PURPOSES

Gunther Lange, Konigsbronn, Wurttemberg, Germany, assignor to Carl Zeiss, Heidenheim (Brenz), Wurttemberg, Germany Application August 9, 1955, Serial No. 527,232

Claims priority, application Germany March 25, 1955

4 Claims. (Cl. 88—57)

The invention is concerned with a lens system which can be put in the place of the front member of a 3-component photographic objective (basic objective) consisting of a collective front lens, of a biconcave middle lens and of a collective rear member, producing in this way, in conjunction with the two remaining components of the basic objective (middle lens plus rear member) an objective of equal focal intercept but of shorter focal length than the basic objective.

The investigations on which the invention is based have shown that for such a system the use of five lenses, namely of three collective and two dispersive lenses, is sufficient. It is however clear that with additional lenses even better correction can be attained, e. g. by introducing cemented surfaces in one or more of the components or by splitting some members by air spaces, without altering the basic structure of the system.

The basic structure of the system according to the present invention is characterized in that the arrangement of the lenses and of their surfaces is selected as follows:

The front member shall be a cemented dispersive meniscus presenting its convex side to the object and containing a collective lens made from a glass of high dispersion ($v<50$); the axial thickness of this first member shall lie between the limits $0.06 \times f$ and $0.30 \times f$; the radius of the anterior external surface of this front member shall lie between the limits $0.50 \times f$ and $2.00 \times f$, the radius of the posterior external surface between the limits $0.20 \times f$ and $0.80 \times f$.

At a distance of at least $0.20 \times f$, but at most $0.70 \times f$ from the described front member there shall be an asymmetrical collective member; the more deeply curved surface of this member shall be on the side further from the object. The radius of this surface shall be between the limits $-1.20 \times f$ and $-0.60 \times f$ and shall be numerically smaller than $\frac{1}{3}$ of the radius of the other surface of this member; the axial thickness of this member shall lie between the limits $0.12 \times f$ and $0.48 \times f$.

The system shall further contain behind the last-mentioned member a collective surface convex towards the object with a radius of curvature within the limits $0.35 \times f$ and $0.80 \times f$, which has an apical separation from the last surface of the system of at least $0.15 \times f$ but at most $0.50 \times f$; the last surface of the system shall be a collective surface, its radius shall lie between the limits $-2.0 \times f$ and $-1.0 \times f$; between the two last-mentioned collective surfaces at least one dispersive surface shall be arranged. Furthermore it is advisable to observe the following additional conditions: The air space between the last lens of the system and the anterior surface of the biconcave middle lens of the basic objective shall be smaller than $0.20 \times f$. The total length of the system shall lie between the limits $0.80 \times f$ and $1.65 \times f$. The last lens shall be designed as a meniscus-shaped dispersive lens and shall consist of a glass whose $v$-value is smaller than 50. Its anterior radius shall then lie between the limits $-1.0 \times f$ and $-0.5 \times f$. Its apical separation from the preceding lens shall be smaller than $0.10 \times f$. It is a further advantage if the arithmetical mean of the N-values of all dispersive lenses is greater than the arithmetical mean of the N-values of all collective lenses.

In the conditions mentioned above $f$ means the focal length of the entire objective, therefore of the system according to the invention including the remaining part of the basic objective.

In the attached instructions two objectives are represented. The objective shown in Fig. 1 consists of a lens system according to the invention and of the two posterior members (remaining members) of a 3-component objective (basic objective). The objective shown in Fig. 2 is the complete basic objective. The lens system according to the invention contains five lenses which are collected into four members. The two objectives according to Fig. 1 and Fig. 2 show the same focal intercepts but different focal lengths, where the focal length of the objective according to Fig. 1 is the shorter.

In the attached tables, the numerical values for the embodiment of the invention shown in Fig. 1 are given in Table 1 and those for the basic objective are given in Table 2. The latter is not in itself the object of the present invention. In the figures and tables there are designated By L the lenses,
By r the radii of the surfaces,
By d the separations of the surfaces from each other,
By $N_d$ the refractive indices, and
By $v$ the Abbe-numbers or constringencies.

The data given in Table 1 are referred to a focal length $f=1$. The focal length of the basic objective is longer; the focal lengths are in the ratio of 1:2 approximately.

Table 1

| Lenses | Radii | Separations | $n_d$ | $v$ |
|---|---|---|---|---|
| $L_I$ | $r_1=+1.01065$ | $d_1=0.13640$ | 1.74000 | 28.2 |
|  | $r_2=+3.19587$ |  |  |  |
| $L_{II}$ |  | $d_2=0.03546$ | 1.74400 | 44.9 |
|  | $r_3=+0.438637$ |  |  |  |
|  |  | $d_3=0.541955$ |  |  |
|  | $r_4=-10.2530$ |  |  |  |
| $L_{III}$ |  | $d_4=0.27280$ | 1.50378 | 66.7 |
|  | $r_5=-0.802773$ |  |  |  |
|  |  | $d_5=0.06820$ |  |  |
|  | $r_6=+0.556187$ |  |  |  |
| $L_{IV}$ |  | $d_6=0.26325$ | 1.50378 | 66.7 |
|  | $r_7=-0.695180$ |  |  |  |
|  |  | $d_7=0.01855$ |  |  |
|  | $r_8=-0.675456$ |  |  |  |
| $L_V$ |  | $d_8=0.02728$ | 1.74400 | 44.9 |
|  | $r_9=-1.28151$ |  |  |  |
|  |  | $d_9=0.05456$ |  |  |
|  | $r_{12}=-1.15040$ |  |  |  |
| $L_{VII}$ |  | $d_{12}=0.03683$ | 1.62536 | 35.6 |
|  | $r_{13}=+0.464608$ |  |  |  |
|  |  | $d_{13}=0.11130$ |  |  |
|  | $r_{14}=-13.0947$ |  |  |  |
| $L_{VIII}$ |  | $d_{14}=0.03274$ | 1.54869 | 45.4 |
|  | $r_{15}=+0.576566$ |  |  |  |
| $L_{IX}$ |  | $d_{15}=0.12276$ | 1.72000 | 50.3 |
|  | $r_{16}=-0.779994$ |  |  |  |

Table 2

| Lenses | Radii | Separations | $n_d$ | $v$ |
|---|---|---|---|---|
|  | $r_{10}=+0.536546$ |  |  |  |
| $L_{VI}$ |  | $d_{10}=0.13995$ | 1.69100 | 54.8 |
|  | $r_{11}=+8.38210$ |  |  |  |
|  |  | $d_{11}=0.08402$ |  |  |
|  | $r_{12}=-1.15040$ |  |  |  |
| $L_{VII}$ |  | $d_{12}=0.03683$ | 1.62536 | 35.6 |
|  | $r_{13}=+0.464608$ |  |  |  |
|  |  | $d_{13}=0.11130$ |  |  |
|  | $r_{14}=-13.0947$ |  |  |  |
| $L_{VIII}$ |  | $d_{14}=0.03274$ | 1.54869 | 45.4 |
|  | $r_{15}=+0.576566$ |  |  |  |
| $L_{IX}$ |  | $d_{15}=0.12276$ | 1.72000 | 50.3 |
|  | $r_{16}=-0.779994$ |  |  |  |

I claim:
1. An interchangeable lens system for photographic purposes, which can be put in the place of the front member of a three-component photographic objective (basic objective) consisting of a collective front lens, of a biconcave middle lens and of a collective rear member, producing in this way in conjunction with the two remaining components of the basic objective (middle lens plus rear member) an objective showing an equal focal intercept but a shorter focal length ($f$) than the basic objective, and characterized by the following particulars and comprising a front-component formed as a cemented dispersive meniscus presenting its convex side to the object, and containing a collective lens made from a glass of high dispersion ($v<50$), the axial thickness of this first component lies between the limits $0.06 \times f$ and $0.30 \times f$, the radius of the anterior external surface of this front component lies between the limits of $0.50 \times f$ and $2.00 \times f$, the radius of the posterior external surface lies between the limits $0.2 \times f$ and $0.8 \times f$, an asymmetrical collective member positioned a distance at least $0.20 \times f$, but at most $0.70 \times f$ from the front member; the more deeply curved surface of said member is on the side further from the object, the radius of said deeply curved surface lies between the limits $-1.20 \times f$ and $-0.6 \times f$ and is simultaneously numerically smaller than ⅓ of the radius of the other external surface of said member, the axial thickness of said member lies between the limits $0.12 \times f$ and $0.48 \times f$, and positioned behind the last-mentioned said member, a collective surface convex towards the object with a radius of curvature within the limits $0.35 \times f$ and $0.80 \times f$ having an apical separation from the last surface of the system of at least $0.15 \times f$ but at most $0.5 \times f$, the last said surface of the system being a collective surface whose radius lies between the limits $-2.0 \times f$ and $-1.0 \times f$, and at least one dispersive surface lying between the two last-mentioned collective surfaces.

2. A lens system according to claim 1 characterized in that the air space between the last lens of the system and the anterior surface of the biconcave middle lens of the basic objective is smaller than $0.20 \times f$ and that the total length of the system lies between the limits $0.80 \times f$ and $1.65 \times f$.

3. A lens system according to claim 1 characterized in that the last lens is designed as a meniscus-shaped dispersive lens and consists of a glass whose $v$-value is smaller than 50, that its anterior radius lies between the limits $-1.0 \times f$ and $-0.5 \times f$ and that its apical separation from the preceding lens is smaller than $0.10 \times f$.

4. A photographic objective consisting of a lens system according to claim 1 and of the remainder of another objective consisting of a biconcave dispersive lens and of a collective member characterized in that the refractive powers of the surfaces ($\Delta n/r$) differ by not more than $\pm 0.5 \times f$, and that the apical separations ($d$) of the surfaces differ by not more than $\pm 0.2 \times f$ from the numerical values to be taken from the following table:

| Lenses | Radii | Separations | Nd | $v$ | $\Delta n/r$ |
| --- | --- | --- | --- | --- | --- |
| $L_I$ | $r_1 = + 1.01065 \cdot f$ | | 1.74000 | 28.2 | $+0.732202/f$ |
| | $r_2 = + 3.19587 \cdot f$ | $d_1 = 0.13640 \cdot f$ | | | $+0.001252/f$ |
| $L_{II}$ | | $d_2 = 0.03546 \cdot f$ | 1.74400 | 44.9 | |
| | $r_3 = + 0.438637 \cdot f$ | $d_3 = 0.541955 \cdot f$ | | | $-1.696163/f$ |
| $L_{III}$ | $r_4 = -10.2530 \cdot f$ | $d_4 = 0.27280 \cdot f$ | 1.50378 | 66.7 | $-0.049135/f$ |
| | $r_5 = - 0.802773 \cdot f$ | $d_5 = 0.06820 \cdot f$ | | | $+0.627549/f$ |
| $L_{IV}$ | $r_6 = + 0.556187 \cdot f$ | $d_6 = 0.26325 \cdot f$ | 1.50378 | 66.7 | $+0.905774/f$ |
| | $r_7 = - 0.695180 \cdot f$ | $d_7 = 0.01855 \cdot f$ | | | $+0.724675/f$ |
| $L_V$ | $r_8 = - 0.675456 \cdot f$ | $d_8 = 0.02728 \cdot f$ | 1.74400 | 44.9 | $-1.101478/f$ |
| | $r_9 = - 1.28151 \cdot f$ | $d_9 = 0.05456 \cdot f$ | | | $+0.580565/f$ |
| $L_{VII}$ | $r_{12} = - 1.15040 \cdot f$ | $d_{12} = 0.03683 \cdot f$ | 1.62536 | 35.6 | $-543602/f$ |
| | $r_{13} = + 0.464608 \cdot f$ | $d_{13} = 0.11130 \cdot f$ | | | $-1.345994/f$ |
| $L_{VIII}$ | $r_{14} = -13.0947 \cdot f$ | $d_{14} = 0.03274 \cdot f$ | 1.54869 | 45.4 | $-0.041902/f$ |
| | $r_{15} = + 0.576566 \cdot f$ | $d_{15} = 0.12276 \cdot f$ | 1.72000 | 50.3 | $+0.297121/f$ |
| | $r_{16} = - 0.779994 \cdot f$ | | | | $+0.923088/f$ |

References Cited in the file of this patent

UNITED STATES PATENTS

| | | |
| --- | --- | --- |
| 1,651,493 | Warmisham | Dec. 6, 1927 |
| 1,934,561 | Rayton | Nov. 7, 1933 |
| 2,169,130 | Tronnier et al. | Aug. 8, 1939 |
| 2,184,018 | Ort | Dec. 19, 1939 |
| 2,317,790 | Mellor | Apr. 27, 1943 |
| 2,324,057 | Bennett | July 13, 1943 |
| 2,612,077 | Albrecht | Sept. 30, 1952 |